US012579960B2

(12) United States Patent
McRoskey

(10) Patent No.: US 12,579,960 B2
(45) Date of Patent: Mar. 17, 2026

(54) PIVOT PICK

(71) Applicant: Guy William McRoskey, Encinitas, CA (US)

(72) Inventor: Guy William McRoskey, Encinitas, CA (US)

( * ) Notice: Subject to any disclaimer, the term of this patent is extended or adjusted under 35 U.S.C. 154(b) by 226 days.

(21) Appl. No.: 18/421,380

(22) Filed: Jan. 24, 2024

(65) Prior Publication Data

US 2025/0239238 A1 Jul. 24, 2025

(51) Int. Cl.
*G10D 3/173* (2020.01)

(52) U.S. Cl.
CPC .................................... *G10D 3/173* (2020.02)

(58) Field of Classification Search
CPC ................................ G10D 3/173; G10D 3/00
See application file for complete search history.

(56) References Cited

U.S. PATENT DOCUMENTS

| | | | | |
|---|---|---|---|---|
| D268,844 S * | 5/1983 | McPherson, Sr. | ..... G10D 3/173 84/322 |
| 5,837,913 A | 11/1998 | Newman | |
| 5,864,075 A | 1/1999 | Mapson | |
| 5,973,243 A | 10/1999 | Christenson | |
| 6,118,058 A | 9/2000 | Rowley | |
| 6,797,871 B2 | 9/2004 | Atkin | |
| 6,949,700 B1 | 9/2005 | Kelly | |
| 6,977,330 B2 | 12/2005 | Santa Cruz et al. | |
| 7,312,386 B2 | 12/2007 | Sielaff et al. | |
| 7,589,267 B1 | 9/2009 | Sims | |
| 7,786,362 B1 | 8/2010 | Whetstine | |
| 7,799,979 B2 | 9/2010 | Swartz | |
| 8,664,498 B2 | 3/2014 | Leneman | |
| 9,240,167 B2 | 1/2016 | Caccia | |
| 9,754,564 B2 | 9/2017 | Knapp | |
| 10,192,531 B1 | 1/2019 | Cobb | |
| 10,706,826 B1 | 7/2020 | Sweeney | |
| 11,087,724 B1 * | 8/2021 | McBride | ................ G10D 3/173 |
| 2009/0139384 A1 | 6/2009 | Bramucci | |
| 2010/0263515 A1 | 10/2010 | Hollin, Jr. | |
| 2015/0255050 A1 | 9/2015 | Diaz Lopez | |
| 2015/0294653 A1 | 10/2015 | Harrington | |

* cited by examiner

*Primary Examiner* — Kimberly R Lockett
(74) *Attorney, Agent, or Firm* — Dunlap Bennett & Ludwig PLLC

(57) ABSTRACT

A pivot pick includes a thumb ring configured to fit on a thumb of a user. The pivot pick also includes a pick assembly movably coupled to the thumb ring. The pick assembly includes a pick. When placed on the thumb of the user, the pick is oriented in a thumbpick position. When a force is applied to the pick by an index finger, the pick assembly rotates relative to the thumb ring to orient the pick in a flat-pick position. The pivot pick includes a tether coupled between the thumb ring and the pick assembly. The tether restricts the rotation of the pick assembly beyond the thumbpick position.

10 Claims, 4 Drawing Sheets

PIVOT PICK

FIELD

The present disclosure relates to music accessories and, more particularly, to guitar picks.

BACKGROUND

Guitarists utilize different playing styles when playing a guitar. These styles include, for example, strumming, fingerstyle, hybrid picking, and lead-guitar picking, etc. In connection with these different playing styles, different types of guitar picks are used, for example, thumbpicks and flat-picks, are frequently used by guitarists. Strummers commonly strum with a flat-pick, and lead-guitar players also commonly play with a flat-pick. While many guitarists play fingerstyle without any pick, some fingerstyle players play with a thumbpick, which is secured to the thumb, and four free fingers. Finally, hybrid pickers, use a flat-pick (held between the thumb and the index finger) and the three free fingers. Prior to this invention, there has not been a device that enables a pick to be readily and interchangeably utilized as both a thumbpick and as a flat-pick. The "Pivot Pick"™, described below, overcomes this limitation.

SUMMARY

Aspects of the present disclosure are directed to a pivot pick. A pivot pick includes a thumb ring configured to fit on a thumb of a user. The pivot pick also includes a pick assembly movably coupled to the thumb ring. The pick assembly includes a pick. When placed on the thumb of the user, the pick is oriented in a thumbpick position. When a force is applied to the pick by the index finger, the pick assembly rotates relative to the thumb ring to orient the pick in a flat-pick position. The pivot pick includes a tether coupled between the thumb ring and the pick assembly. The tether restricts the rotation of the pick assembly beyond the thumbpick position.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

As discussed above, while flat-picks and thumbpicks are conventional and popular in the music community, these separate and different guitar picks have drawbacks. Thumbpicks have a fixed orientation which extends in a plane substantially parallel with the ground, referred to herein as the "thumbpick position." Flat-picks, on the other hand, assume an orientation, when held between the thumb and index finger, which extends in a plane at an angle of approximately 15-22 degrees relative to the plane which is parallel to the ground, referred to herein as the "flat-pick position." In other words, the optimal and conventional thumbpick position is substantially different from the optimal and conventional flat-pick position. Hence, in the course of playing a song, guitarists generally cannot readily avail themselves of the benefits of both a thumbpick and a flat-pick, without changing guitar picks.

Figure 1:
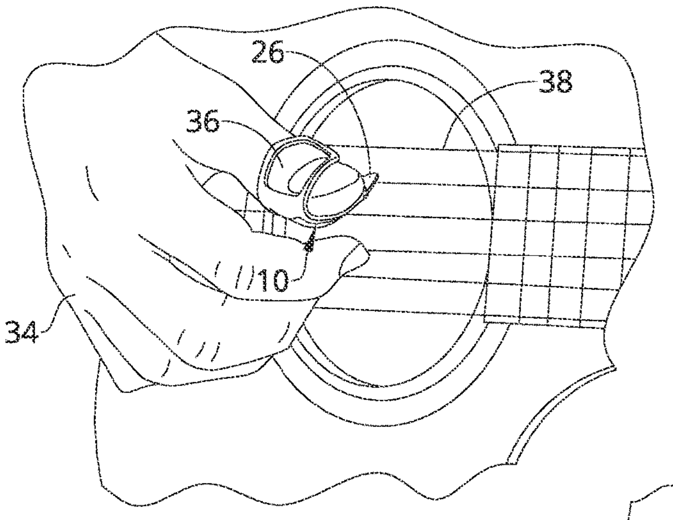
FIG. 1 is a perspective view of a Pivot Pick, in use as a thumb pick, according to aspects of the present disclosure.
Figure 2:
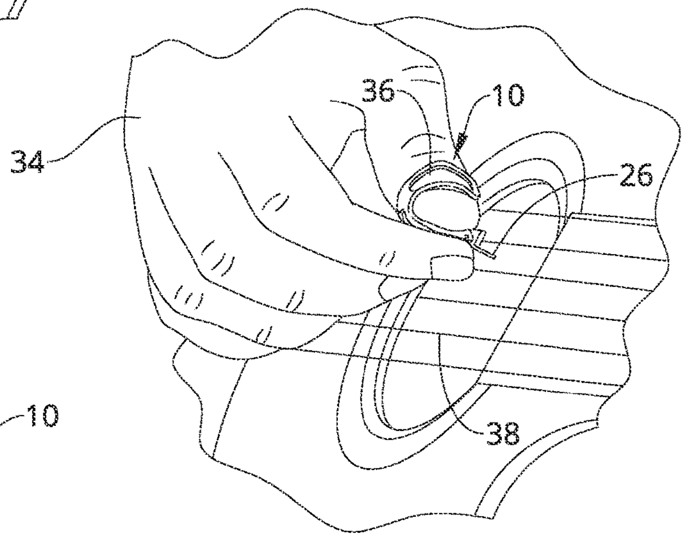
FIG. 2 is a perspective view of a Pivot Pick, in use as a flat pick, according to aspects of the present disclosure.

Broadly, an embodiment of the present disclosure provides a Pivot Pick that overcomes the above drawbacks by providing a single pick that easily switches between the thumbpick and flat pick position. Referring now to FIG. 1-7, FIGS. 1 and 2 illustrate a Pivot Pick 10, according to aspects of the present disclosure. As illustrated in FIGS. 1 and 2, the Pivot Pick 10 can be placed on the thumb 36 of a hand 34 of a user, the guitarist, in order to strike various strings 38 of a guitar. The Pivot Pick 10 can be placed in a thumbpick orientation and flat-pick orientation based on the position of the index finger of the guitarist. As illustrated in FIG. 1, when the index finger of the guitarist is disengaged from the Pivot Pick 10, the Pivot Pick 10 can be utilized as a thumbpick. As illustrated in FIG. 2, when the index finger of the guitarist is engaged with the Pivot Pick 10, the Pivot Pick 10 can be utilized as a flat pick. While FIGS. 1 and 2 illustrate the Pivot Pick being on the right hand of a guitarist, the Pivot Pick 10 can be adapted for either the right hand or the left hand, to match the preference of the guitarist.

Figure 3:
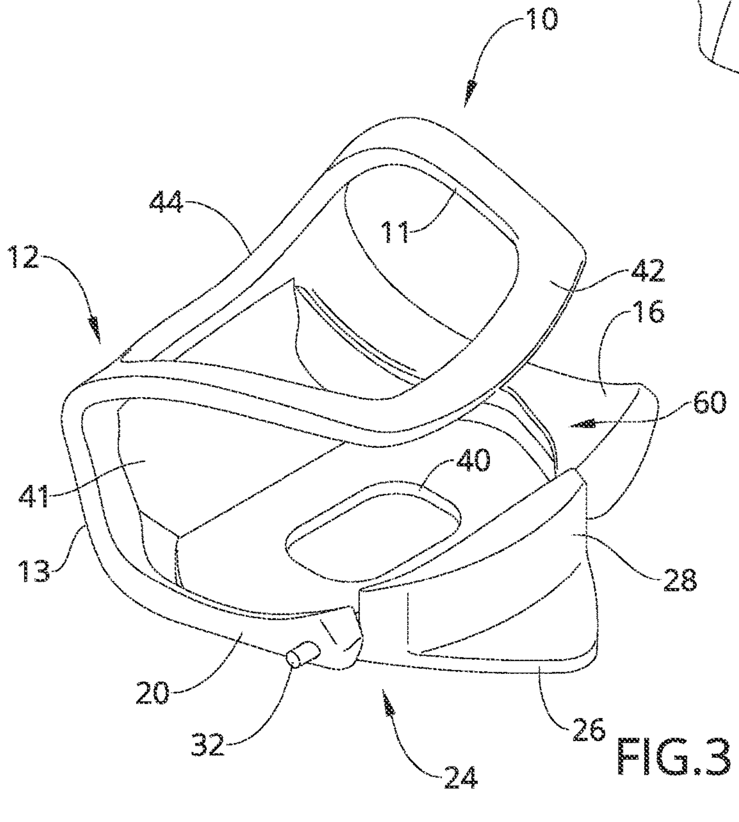
FIG. 3 is a front perspective view of a Pivot Pick, according to aspects of the present disclosure.
Figure 4:
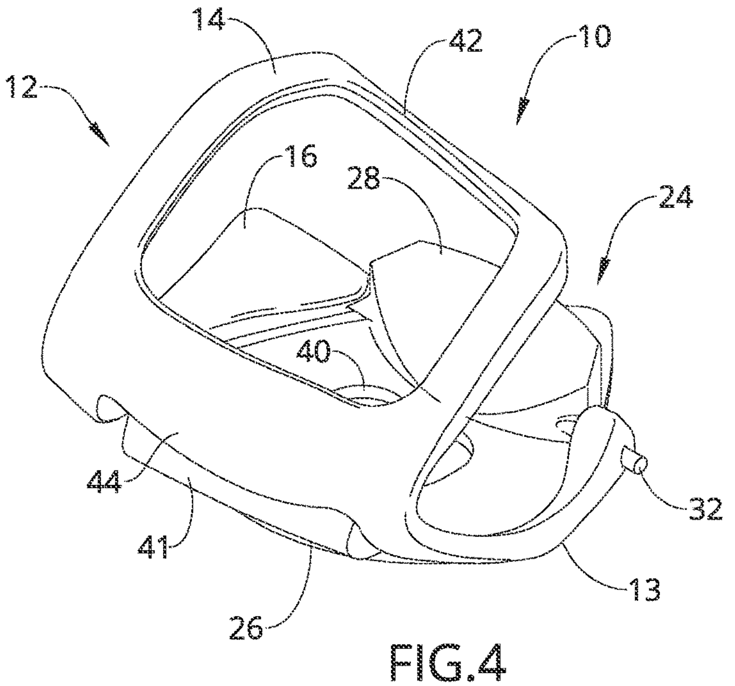
FIG. 4 is a rear perspective view of the Pivot Pick of FIG. 2, according to aspects of the present disclosure
Figure 5:
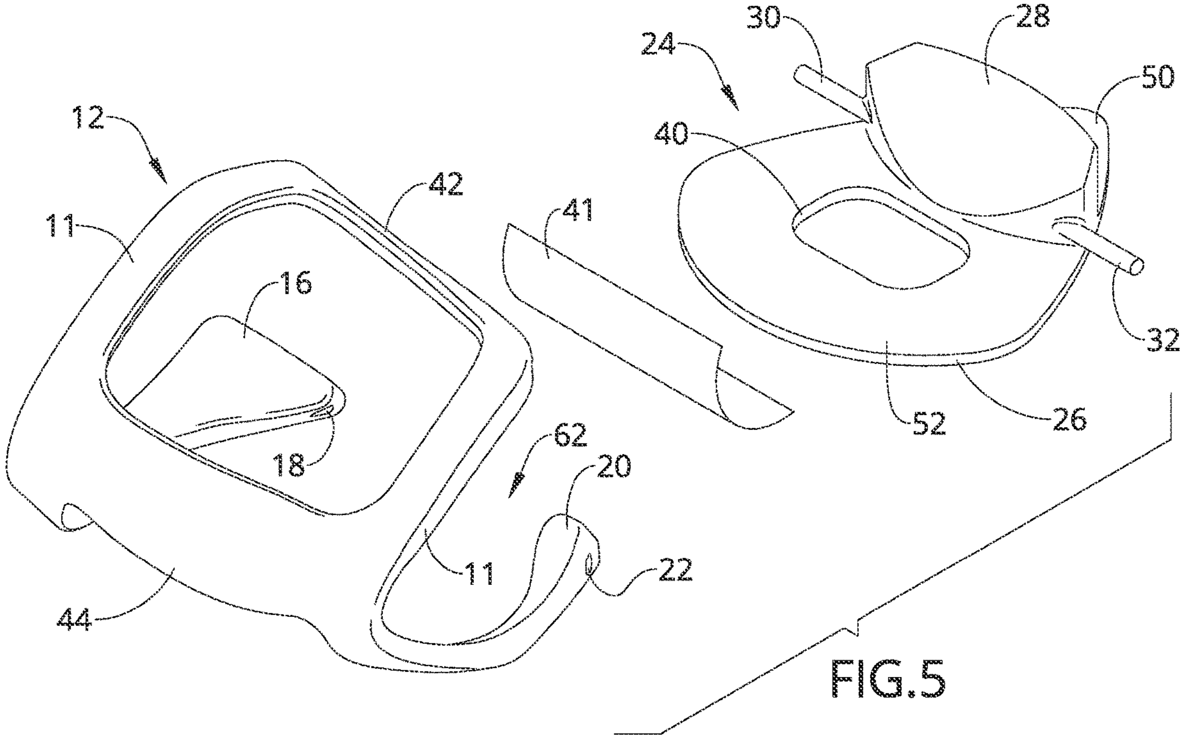
FIG. 5 is a rear perspective exploded view of the Pivot Pick of FIG. 2, according to aspects of the present disclosure.

FIG. 3 shows a detailed view of the Pivot Pick 10, according to aspects of the present disclosure. While FIG. 3 illustrates various components of the Pivot Pick 10, additional components can be added, and existing components can be removed. As illustrated in FIG. 5, the Pivot Pick 10 includes a thumb ring 12 and a pick assembly 24. As illustrated in FIG. 3, the Pivot Pick also includes a tether 41. The thumb ring 12, pick assembly 24, and the tether 41 operate to allow the Pivot Pick 10 to be used in either a thumbpick orientation or a flat-pick orientation.

In embodiments, the thumb ring 12 includes two partial hoops, a proximal hoop 11 and a distal hoop 13. The proximal hoop 11 and the distal hoop 13 each have the approximate shape of a "C." In some embodiments, the distal hoop 13 can have lower and/or smaller profile relative to the proximal hoop 11 to prevent any potential interference with guitar during usage. With reference to their position relative to the thumb of the user, the distal hoop 13 traverses across the thumbnail, and the proximal hoop 11 traverses across the knuckle, as discussed below with reference to FIGS. 6 and 7. The proximal hoop 11 and the distal hoop 13 are connected by two lateral components, an upper bridge 42 and a lower bridge 44. The upper bridge 42 runs approximately from the medial edge of the user's thumbnail to the medial edge of the user's thumb knuckle when worn by the user. The lower bridge 44 runs just above the lateral edge of the user's thumb when worn by the user. Located near the terminal ends of the proximal hoop 11 and the distal hoop 13 (opposite the upper bridge 42), the Pivot Pick 10 includes two housings, a distal pin housing 20 and a proximal pin housing 16. Each of the distal pin housing 20 and the proximal pin housing 16 includes a boring, such borings being in linear alignment.

The pick assembly 24 includes a pick 26 resembling a traditional flat-pick. As illustrated in FIG. 5, the pick assembly 24 includes rotation pins 30 and 32, and, optionally, a ramp 28. The rotation pins 30 and 32 can be seen to divide the pick 26 into a front portion 50 extending from the rotation pins 30 and 32 to the tip of the pick 26 and a back portion 52 extending beyond the rotation pins 30 and 32 to the back edge of the pick 26. In some embodiments, the pick assembly 24 can be constructed of a semi-rigid and polished plastic material, e.g., nylon. In some embodiments, the back portion 52 of the pick 26 can include a window 40. The window 40 can allow a portion of the user's thumb to protrude into and through the window 40.

In some embodiments, the thumb ring 12 and pick assembly 24 can be adjoined to each other through a procedure of temporarily spreading the distal pin housing 20 and the proximal pin housing 16 further apart from each other and inserting the rotation pins 30 and 32 into the distal pin housing 20 and the proximal pin housing 16, after which the rotation pins 30 and 32 rotate freely within the distal pin housing 20 and the proximal pin housing 16. As the rotation pins 30 and 32 rotate within the distal pin housing 20 and the proximal pin housing 16, the pick assembly rotates relative to the thumb ring. As discussed below, the rotation allows the pick 26 to move from the flat-pick position to the thumbpick position, and vice versa. The tether 41 can be coupled to the back portion 52 of the pick and the lower bridge 44. The tether 41 can be constructed of a flexible or semi-flexible material.

In embodiments, the thumb ring 12 includes a gap 60 between the upper bridge 42, and the distal pin housing 20 and the proximal pin housing 16. The gap 60 provides an opening for the medial edge of the thumb, which minimizes the danger of a guitar string coming into contact with the thumb ring 12 during use. The thumb ring 12 includes an underside opening 62 designed to accept the fatty portion of the thumb. This underside opening 62 allows free movement of the pick 26 and avoids any interference by the thumb ring 12 with the direct tactile engagement of the pick 26 with both the fatty portion of the user's thumb and the user's index finger, when applied to the pick 26.

In some embodiments, the thumb ring 12 can be constructed of a flexible material, e.g., nylon. The flexibility can allow aforementioned spreading apart of the distal pin housing 20 and the proximal pin housing 16 in order to insert the rotation pins 30 and 32 into the distal pin housing 20 and the proximal pin housing 16.

In some embodiments, the ramp 28 of the pick assembly 24 can add stability to the Pivot Pick 10 when in use. Such stability can minimize the possibility of the Pivot Pick inadvertently slipping off of the user's thumb. If utilized, the ramp 28 should not have a height from the pick 26 surface sufficient to cover the medial edge of the thumb, such limitation being desirable in order to preserve the benefits of gap 60 discussed above.

The tether 41 can be coupled to the back portion 52 of the pick 26 and the lower bridge 44. The tether 41 can be constructed for a flexible or semi-flexible material. The attachment can be with strong adhesive or any other means of attachment. The tether 41 should be light-weight and flexible. The tether 41 serves to restrict the extent of potential pivoting of the back portion 52 of the pick 26 away from the lower bridge 44. The length of the tether 41 can be that length that allows movement of the back portion 52 of the pick 26 away from the lower bridge 44, but only to the extent necessary to achieve the thumbpick position.

Figure 6:
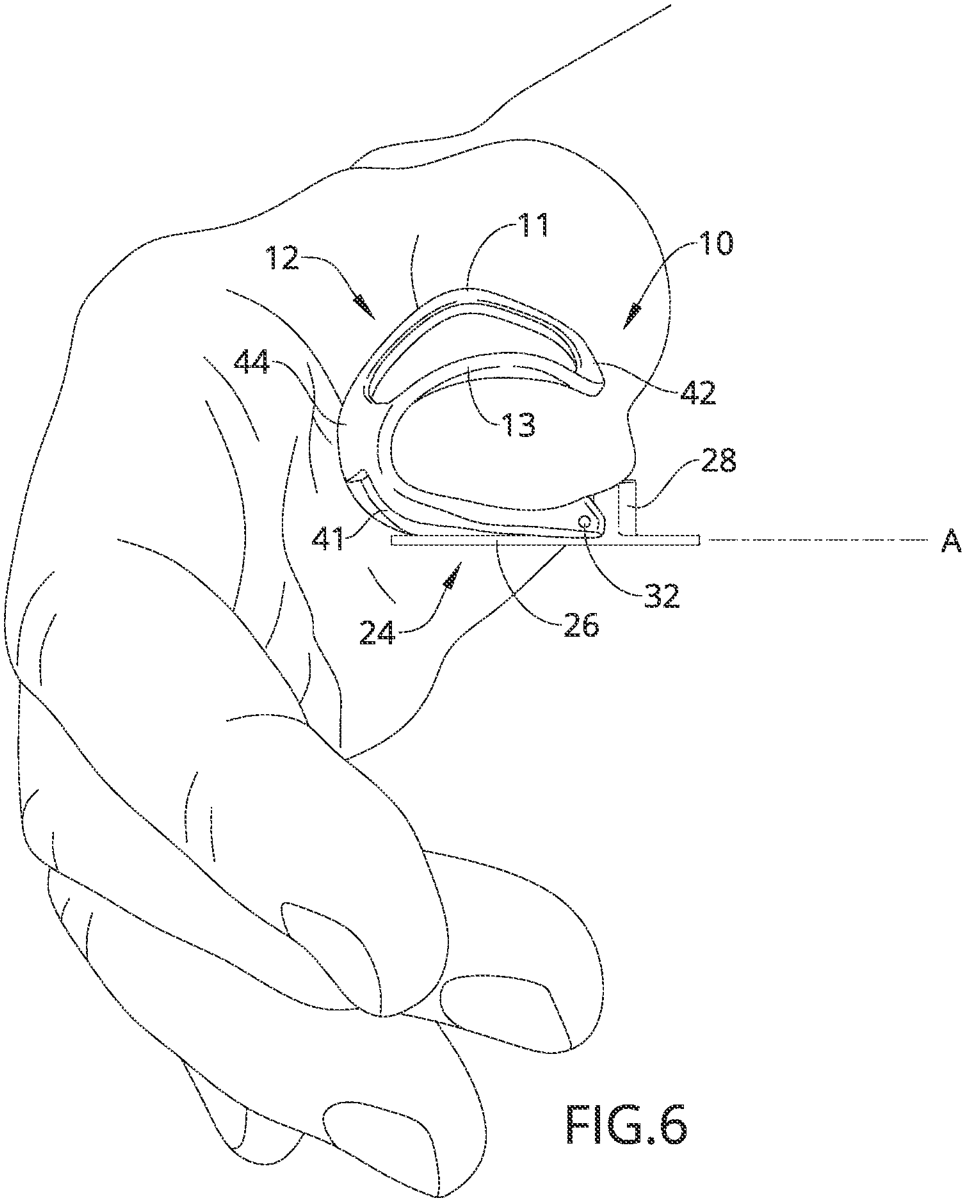
FIG. 6 is a side view of the Pivot Pick of FIG. 2, in use as a thumb pick, according to aspects of the present disclosure.
Figure 7:
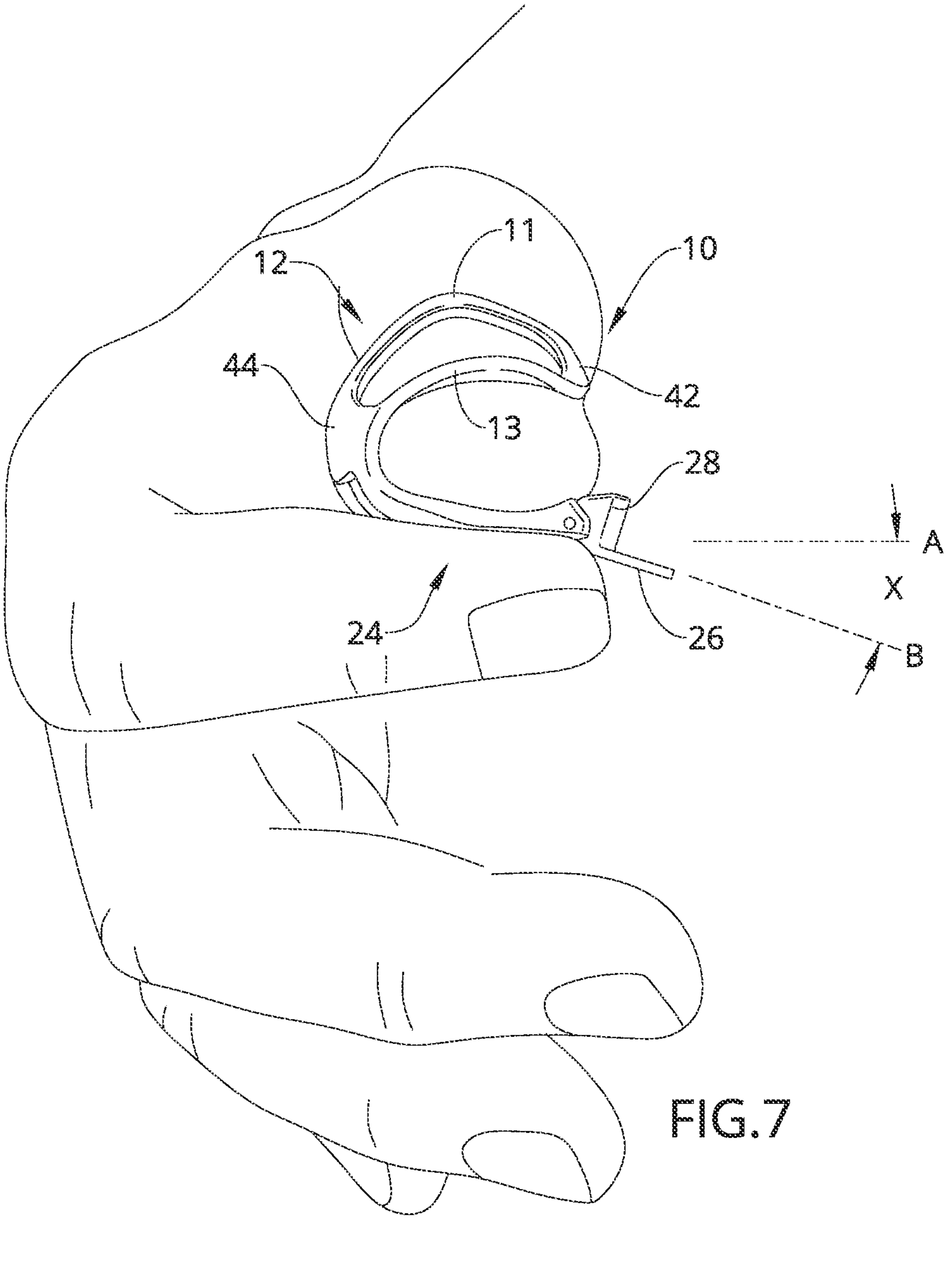
FIG. 7 is a side view of the Pivot Pick of FIG. 2, in use as a flat-pick according to aspects of the present disclosure.

As illustrated in FIGS. 6 and 7, to use the Pivot Pick 10, the user slides the thumb ring 12 over the thumb, with the pick 26 residing underneath and in contact with the fatty portion of the thumb, with the tip of the pick 26 protruding beyond the medial edge of the user's thumb. Without applying the index finger, three design features cooperate to hold the pick 26 in a default thumbpick position: (1) the rotation pins 30 and 32 are retained in the distal pin housing 20 and the proximal pin housing 16 but are free to rotate within such distal pin housing 20 and the proximal pin housing 16, (2) the fatty portion of the thumb resists rotation of the pick 26 further into such fatty portion of the thumb, and (3) the tether 41 resists rotation of the back portion 52 away from the fatty portion of the thumb beyond the reach of such the tether 41. The operation of these three constraints cooperates to hold the pick 26 in the thumbpick position.

As illustrated in FIG. 7, from the thumbpick position, the user applies the index finger to the underside of the back portion 52 of the pick 26, exerting sufficient pressure to compress the fatty portion of the thumb. This action, combined with the confinement of the rotation pins 30 and 32 in the distal pin housing 20 and the proximal pin housing 16, causes the rotation pins 30 and 32 to rotate slightly relative to the distal pin housing 20 and the proximal pin housing 16, with a corresponding rotation of the pick 26 into the flat-pick position. Notably, at this point the tether 41 is no longer taut. At this point, removing the index finger reverses the sequence described above, resulting in a return to the thumbpick position.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A pivot pick, comprising:

a thumb ring configured to fit on a thumb of a user;

a pick assembly movably coupled to the thumb ring by way of rotation elements that define a pivot axis, wherein:

the pick assembly comprises a pick, when placed on the thumb of the user, the pick is oriented in a thumbpick position, and the pivot axis is located closer to a front portion of the pick than to a back portion of the pick so that when a force is applied to the back portion of the pick by an index finger, the pick assembly rotates relative to the thumb ring to orient the pick in a flat-pick position; and a tether coupled between the thumb ring and the pick assembly.

2. The pivot pick of claim 1, wherein the thumb ring comprises:

a proximal hoop;

a distal hoop coupled to the proximal hoop and spaced a distance in a first direction; and at least one bridge coupled between the proximal hoop and the distal hoop, wherein the pick assembly rotates about the pivot axis oriented in the first direction.

3. The pivot pick of claim 2, wherein the proximal hoop and the distal hoop each have an approximate C shape.

4. The pivot pick of claim 2, wherein the at least one bridge comprises:

an upper bridge coupled to a first end of the proximal hoop and a first end the distal hoop; and a lower bridge coupled to the proximal hoop at between the first end of the proximal hoop and a second end of the proximal hoop and coupled to distal hoop at between the first end of the distal hoop and a second end of the distal hoop.

5. The pivot pick of claim 4, wherein the thumb ring further comprises:

a proximal pin housing coupled to the second end of the proximal hoop; and a distal pin housing coupled to the second end of the distal hoop.

6. The pivot pick of claim 5, the pick assembly further comprises:

the rotation elements positioned on opposing sides of the pick, wherein the rotation elements are respectively coupled to the proximal pin housing and the distal pin housing.

7. The pivot pick of claim 6, the pick assembly further comprises:

a ramp extending from a top surface of the pick between the rotation elements.

8. The pivot pick of claim 1, the pick includes a window formed from a top surface of the pick to a bottom surface of the pick.

9. The pivot pick of claim 1, wherein moving the pick from the thumbpick position to the flat-pick position is accomplished by a pressing of the index finger of the user against the bottom surface of the pick with sufficient force to rotate the pick assembly against an opposing pressure exerted on a top side of the pick by a fatty underside of the thumb.

10. The pivot pick of claim 1, wherein the tether restricts the rotation of the pick assembly beyond the thumbpick position.

* * * * *